US010861179B2

(12) United States Patent
Kato

(10) Patent No.: US 10,861,179 B2
(45) Date of Patent: Dec. 8, 2020

(54) IMAGE INSPECTING APPARATUS, IMAGE INSPECTING METHOD AND IMAGE INSPECTING PROGRAM

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 155 days.

(21) Appl. No.: 16/219,901

(22) Filed: Dec. 13, 2018

(65) Prior Publication Data

US 2019/0279388 A1 Sep. 12, 2019

(30) Foreign Application Priority Data

Mar. 6, 2018 (JP) .................................. 2018-039347

(51) Int. Cl.
| | |
|---|---|
| G06T 7/60 | (2017.01) |
| G06T 7/70 | (2017.01) |
| G01N 21/95 | (2006.01) |
| G01B 11/25 | (2006.01) |
| G01N 21/88 | (2006.01) |

(52) U.S. Cl.
CPC ............ *G06T 7/60* (2013.01); *G01B 11/2513* (2013.01); *G01N 21/8806* (2013.01); *G01N 21/9515* (2013.01); *G06T 7/70* (2017.01); *G01N 2021/8829* (2013.01); *G01N 2021/9518* (2013.01); *G06T 2207/30204* (2013.01)

(58) Field of Classification Search
CPC .......... G01N 21/9515; G01N 21/8806; G01N 2021/8829; G01N 2021/9518; G01N 21/956; G01B 11/2513; G06T 7/70; G06T 2207/30204; G06T 7/60
See application file for complete search history.

(56) References Cited

U.S. PATENT DOCUMENTS

| 5,636,024 | A | 6/1997 | Crookham et al. |
| 9,019,492 | B2 * | 4/2015 | Taniguchi ............ G01N 21/956 356/237.5 |
| 10,168,146 | B2 * | 1/2019 | Tin .......................... G06T 7/521 |

(Continued)

FOREIGN PATENT DOCUMENTS

| EP | 1236970 | 9/2002 |
| EP | 2287593 | 2/2011 |
| JP | 2013-191064 | 9/2013 |

OTHER PUBLICATIONS

"Search Report of Europe Counterpart Application", dated Apr. 18, 2019, p. 1-p. 5.

*Primary Examiner* — Brandon J Miller

(74) *Attorney, Agent, or Firm* — JCIPRNET

(57) ABSTRACT

An image inspecting apparatus for inspecting an object under inspection by using an image, including: a lighting part which irradiates the object under inspection with light; an image capturing part which captures an image of the object under inspection; and a control part which causes the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern, is provided.

16 Claims, 6 Drawing Sheets

(56) References Cited

U.S. PATENT DOCUMENTS

| | | | |
|---|---|---|---|
| 2009/0147247 A1* | 6/2009 | Endo | G01N 21/956 356/237.2 |
| 2017/0122878 A1* | 5/2017 | Ono | G01B 11/245 |
| 2017/0156673 A1* | 6/2017 | Uchida | G06K 9/2027 |

* cited by examiner

Illuminating pattern　　　Image

IMAGE INSPECTING APPARATUS, IMAGE INSPECTING METHOD AND IMAGE INSPECTING PROGRAM

CROSS-REFERENCE TO RELATED APPLICATION

This application claims the priority benefit of Japanese Patent Application serial no. 2018-039347, filed on Mar. 6, 2018. The entirety of the above-mentioned patent application is hereby incorporated by reference herein and made a part of this specification.

BACKGROUND

Technical Field

The disclosure relates to an image inspecting apparatus, an image inspecting method, and an image inspecting program.

Description of Related Art

In recent years, an image inspecting apparatus which inspects the appearance of a product by using an image has been widely used in order to automatize the inspection and save the labor in the production line (see, for example, Patent Document 1: Japanese Laid-Open No. 2013-191064). While there are various types and methods of appearance inspection, the basic configuration is as follows. The image of an object under inspection is captured by an image capturing apparatus with a built-in image sensor, a portion serving as the inspection region is extracted from the obtained image, and the targeted inspection is performed by analyzing and evaluating the features of the image of the portion as the inspection region (e.g., judging on good/defective, sorting, obtaining information, etc.).

In this type of image inspecting apparatus, as a technique of inspecting the object under inspection, a technique of obtaining information relating to the state of an object surface by projecting stripe-like pattern light to the object under inspection and analyzing the image in which the object under inspection is photographed is provided, for example. Also, in recent years, to cope with multi-type, small-scale production, attempts have been made to appropriately adjust the relative positional relationship between the object under inspection and the image inspecting apparatus by using an industrial robot and inspect the object under inspection from various angles, for example.

In the case in which the technique of inspecting by irradiating the object under inspection with linear or stripe-like pattern light and analyzing the image in which the object under inspection is photographed is used for inspection of a glossy plane, in the image in which the plane irradiated with the pattern light is photographed, a pattern in a shape equivalent to the pattern light irradiated to the plane is photographed. On the other hand, in the case in which this technique is used for inspecting a glossy curved surface such as the mirror or the body of an automobile, a stripe-like pattern deformed according to the curved surface is photographed in the image in which the curved surface irradiated with the stripe-like pattern light is photographed.

In the image inspection of the object under inspection, as a method of detecting a defect of the object under inspection from the image in which a linear or stripe-like pattern is photographed, for example, a method comparing a pattern recorded in advance with the pattern photographed in the image and performing detection based on a difference between the patterns is provided. In this method, although the defect can be detected relatively easily, in the case in which the place at which the pattern light is irradiated is a curved surface, for example, a pattern deformed according to the curved surface is photographed in the image in which the irradiated place is photographed. Therefore, to detect a defect, a complicated process, such as a filtering process for removing the influence due to pattern distortion, is required.

Also, for example, in a method of irradiating the object under inspection while changing the phases of the stripe-like pattern light and detecting the defect from a singular point of the phase change of the strip-like pattern photographed in the image, uniform stripe-patterned pattern light is usually irradiated to the object under inspection. Then, the stripe of the pattern light irradiated to the object under inspection is adjusted to a width corresponding to the size of the defect to be detected. However, in the case in which the place at which the pattern light is irradiated is a curved surface, since the width of the stripe may increase and decrease in the image in which the irradiated place is photographed, the defect detection accuracy decreases due to the width variation of the stripe. Therefore, in the case in which the place irradiated with the pattern light is a curved surface, while it may be considered to irradiate the object under inspection with pattern light in strips of various widths, tremendous time is required for image capturing because of the increase in the types of pattern light irradiated to the object under inspection.

SUMMARY

According to an embodiment of the disclosure, an image inspecting apparatus for inspecting an object under inspection by using an image is provided. The image inspecting apparatus comprises: a lighting part which irradiates the object under inspection with light; an image capturing part which captures an image of the object under inspection; and a control part which causes the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern.

According to an embodiment of the disclosure, an image inspecting method for inspecting an object under inspection by using an image is provided. The image inspecting method comprises: irradiating the object under inspection with light by using a lighting part; capturing an image of the object under inspection by using an image capturing part; and causing the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern.

According to an embodiment of the disclosure, an image inspecting program for inspecting an object under inspection by using an image is provided. The image inspecting program causes a computer to execute: irradiating the object under inspection with light by using a lighting part; capturing an image of the object under inspection by using an image capturing part; and causing the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern.

DESCRIPTION OF THE EMBODIMENTS

Figure 1:
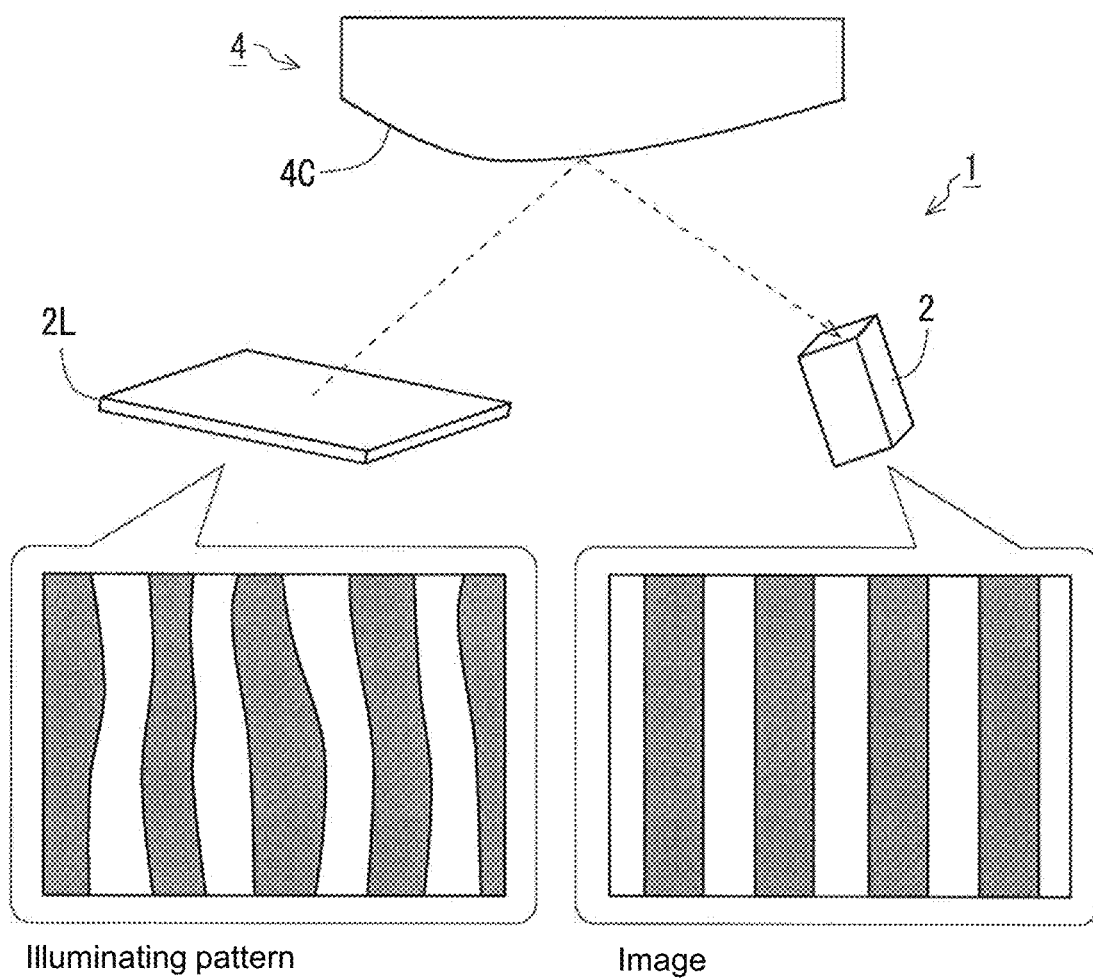
FIG. 1 is a schematic view showing an example of a process realized by an image inspecting apparatus according to an embodiment.

Therefore, the disclosure discloses a technology for suppressing the increase in examination time and deterioration in detection accuracy as much as possible in the case in which the irradiated place at which the object under inspection is irradiated with the pattern light is a curved surface.

In the disclosure, the shape of the pattern light to be irradiated to the object under inspection is prepared based on the shape data of the object under inspection so that the shape of light photographed in the image is a predetermined pattern.

The disclosure provides an image inspecting apparatus for inspecting an object under inspection by using an image. The image inspecting apparatus includes: a lighting part which irradiates the object under inspection with light; an image capturing part which captures an image of the object under inspection; and a control part which causes the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern.

Here, the object under inspection is an object serving as the target of image inspection performed by the image inspecting apparatus, and examples of the object under inspection include industrial products flowing in a production line or components thereof, industrial products recycled from the market or components thereof, agricultural products that are harvested or fishery products that are caught, and various other objects.

Also, the predetermined pattern is a pattern of light used in image processing for inspection in the image inspection of the object under inspection, and examples of the predetermined pattern include a stripe pattern which is uniform and facilitates image processing for inspection.

Also, the shape data is data concerning the shape of the object under inspection. Examples of the shape data include data of the design drawing of the object under inspection or data of the shape obtained by three-dimensionally measuring a good product of the same kind as the object under inspection.

In the above image inspecting apparatus, the pattern light in the shape that is created based on the positional relationship between the lighting part and the image capturing part and the shape data of the object under inspection irradiates the object under inspection, and the predetermined pattern is photographed in the image. The shape of the pattern light may be prepared in advance or may be created at the time when the image capturing part captures the image. In the above image inspecting apparatus, since the object under inspection irradiated with such pattern light is photographed, in the case in which the object under inspection is normal, basically the above predetermined pattern is photographed in the obtained image. That is, in the image used in the image processing for inspection, the pattern light from which the influence on the pattern light due to the shape of the object under inspection is removed based on the shape data of the object under inspection is photographed. Therefore, the increase in inspection time and the decrease in detection accuracy due to shape of the object under inspection can be suppressed.

According to an embodiment of the disclosure, the control part specifies, concerning each position on an image capturing surface, a corresponding point at a position where a second virtual line intersects a light-emitting surface of the lighting part, wherein with respect to a first virtual line connecting a virtual point as a specified position on the image capturing surface of the image capturing part and a reflecting point as an actual position corresponding to the virtual point on the object under inspection photographed on the image capturing surface, the second virtual line adopts a normal line of the reflecting point of the object under inspection as a center and is line symmetrical to the first virtual line, and the control part creates a shape of pattern light of the light-emitting surface based on a corresponding relationship between the virtual point and the corresponding point, such that the pattern light in a shape of the predetermined pattern is emitted to the image capturing surface.

The light emitted from the lighting part is reflected by the object under inspection according to the rule of regular reflection and is emitted to the image capturing part. Therefore, by using two virtual lines adopting the normal line at the reflecting point of the object under inspection as the center and are line symmetrical, the corresponding relationship between the virtual point on the image capturing surface of the image capturing part and the corresponding point on the light-emitting surface of the lighting part is specified, the shape of the pattern light of the light-emitting surface for the light-emitting part to emit light can be created.

According to an embodiment of the disclosure, the control part causes the lighting part to irradiate the pattern light in a shape that, in the case where the lighting part irradiates light, the shape of the light of the lighting part photographed in the image captured by the image capturing part matches a linear or stripe-like light pattern. With the image in which the linear or stripe-like light pattern is photographed, the image processing for inspection is facilitated.

According to an embodiment of the disclosure—the image inspecting apparatus further includes a determining part which determines whether a defect of the object under inspection is present or absent based on a difference between the shape of the light of the lighting part photographed in the image of the object under inspection captured by the image capturing part and the predetermined pattern. In the above image inspecting apparatus, since the pattern light from which the influence on the pattern light due to the shape of the object under inspection is removed based on the shape data of the object under inspection is photographed, the determining part can determine whether the defect is present or absent without using a plurality of reference patterns.

According to an embodiment of the disclosure, the control part causes the lighting part to irradiate the pattern light in a plurality of shapes that, in the case where the lighting part irradiates light, the shape of the light of the lighting part photographed in the image captured by the image capturing part is the stripe-like light pattern and the shapes match a plurality of pattern light where phases of the strip change. In the above image inspecting apparatus, since the influence on the pattern light caused by the shape of the object under inspection is removed based on the shape data of the object under inspection, the defect detection accuracy can be maintained without preparing an illuminating pattern showing variations in the width of the stripes even for pattern light that changes in phase.

Also, the disclosure can also be understood from the aspects of a method and a program. For example, the disclosure provides an image inspecting method for inspecting an object under inspection by using an image. The image inspecting method includes: an illuminating step irradiating the object under inspection with light by using a lighting part; an image capturing step capturing an image of the object under inspection by using an image capturing part; and a controlling step of causing the lighting part to irradiate pattern light in a shape that is created based on a positional relationship between the lighting part and the image capturing part and shape data of the object under inspection and that in a case where the lighting part irradiates light, a shape of the light of the lighting part photographed in the image captured by the image capturing part matches a predetermined pattern.

In the image inspecting apparatus, the image inspecting method and the image inspecting program, the increase in inspection time and the decrease in detection accuracy can be suppressed as much as possible in the case where the irradiated place at which to the object under inspection is irradiated with the pattern light is a curved surface.

Application Example

FIG. 1 is a Schematic View Showing an Example of a Process realized by an image inspecting apparatus 1 according to the embodiment. As shown in FIG. 1, the image inspecting apparatus 1 includes a camera 2 (an example of the "image capturing part" in the disclosure) and a lighting 2L (an example of the "lighting part" of the disclosure), for example, as the main configuration. The camera 2 obtains an image used for inspecting an object 4 under inspection. The lighting 2L irradiates the object 4 under inspection with light in a predetermined illuminating pattern.

The image data obtained by capturing the image of the object 4 under inspection illuminated by the lighting 2L by using the camera 2 is sent to an image processing unit (not shown) provided in the image inspecting apparatus 1. In the image processing unit, the appearance of the object 4 under inspection is inspected by using the image data sent from the camera 2. The object 4 under inspection for which whether a defect is present or absent is verified by the image processing unit is sent to the next process. Examples of the defect whose presence or absence is verified by the image processing unit include uneven defects such as dent marks caused by collision of articles with the object 4 under inspection, color defects caused by defects in surface treatment such as painting, attached foreign matter, and various other defects. Some of these defects are easy to treat while others are irreparable. For example, if the defect detected in the inspection on the appearance of the object 4 under inspection by using the image is simply an attached foreign matter, the defect can be easily eliminated by removing the foreign matter. Therefore, the destination of the object 4 under inspection inspected by the image inspecting apparatus 1 may be switched according to the image determination result on the type of the defect in the image inspecting apparatus 1 in the case in which a defect is found in the image inspection of the image inspecting apparatus 1.

In the image inspecting apparatus 1 so configured, in order to photograph an stripe-patterned illuminating pattern in which linear bands are arranged at equal intervals in the image obtained by using the camera 2 capturing the image of the object 4 under inspection, the illuminating pattern of the lighting 2L irradiating the object 4 under inspection with light is created by using information of the three-dimensional shape of the object 4 under inspection whose shape is already known. Then, in image inspecting apparatus 1, by using the image in which the object 4 under inspection irradiated with the illuminating pattern in a predetermined shape created by using the information of the three-dimensional shape is photographed, the image inspecting apparatus 1 performs inspection and determines whether the defect is present or absent.

In the image inspecting apparatus 1, for example, the phase shift method or various other three-dimensional measurement methods can be applied. Then, the image inspecting apparatus 1 can be used, for example, as one of the FA apparatuses used in the production line for manufacturing automobiles or various other industrial products.

For example, in the phase shift method, the information of the three-dimensional shape of the object under inspection is measured by analyzing the distortion of the pattern when the illuminating pattern in the predetermined shape is irradiated to the object under inspection. Specifically, for example, the image of the object under inspection is captured in the state in which the illuminating pattern in the predetermined shape (for example, a stripe-like pattern whose luminance changes in a sinusoidal manner) is irradiated to the object under inspection by using a lighting. By doing so, on the object under inspection, the pattern distortion corresponding to the unevenness appears. By repeating this process for multiple times while changing the phases of the luminance change of the illuminating pattern, a plurality of images with different luminance features can be obtained. Since the brightness (luminance) at the same pixel of each of the images should change in the same period with the change of the illuminating pattern irradiated to the object under inspection, by applying a sine wave to the brightness change of each pixel, the phase of each pixel can be known. Then, by obtaining the phase difference with respect to the phases at a predetermined reference point, the normal direction at the reference point can be calculated.

In the case of detecting the defect in a planar portion of the object under inspection by using the phase shift method, even if the stripe-patterned illuminating pattern in which linear bands are arranged at equal intervals is irradiated to the planar portion, basically the stripe-patterned illuminating pattern in which linear bands are arranged at equal intervals is photographed in the image in which the planar portion is photographed. On the other hand, in the case of detecting the defect in a non-planar portion, such as a curved portion, by using the phase shift method, when the stripe-patterned illuminating pattern in which linear bands are arranged at equal intervals is irradiated to the non-planar portion, an illuminating pattern deformed according to the shape of the non-planar portion is photographed in the image of the non-planar portion. Therefore, in the case of detecting whether a defect is present or absent by irradiating a non-planar portion with the stripe-patterned illuminating pattern in which linear bands are arranged at equal intervals, since the image of the stripe pattern in which the thicknesses of the bands are changed according to deformation caused by the shape of the non-planar portion is analyzed, the detection accuracy of the defect decreases.

Regarding this, in the image inspecting apparatus 1, the illuminating pattern of the lighting 2L irradiating the object 4 under inspection with light is created by using the information of the three-dimensional shape of the object 4 under inspection whose shape is known, so that even for the image obtained by the camera 2 capturing the image of a curved portion 4C of the object 4 under inspection, the stripe-patterned illuminating pattern in which linear bands are arranged at equal intervals is stilled photographed in the image. Therefore, in the case in which the object 4 under inspection has no defect, basically, the stripe-patterned illuminating pattern in which linear bands are arranged at equal intervals is photographed in the image obtained by the camera 2. Thus, in the image processing unit processing the image of the camera 2, since the image of the stripe pattern in which linear bands are arranged at equal intervals is analyzed, the detection accuracy of the defect does not decrease.

Embodiment

Figure 2:
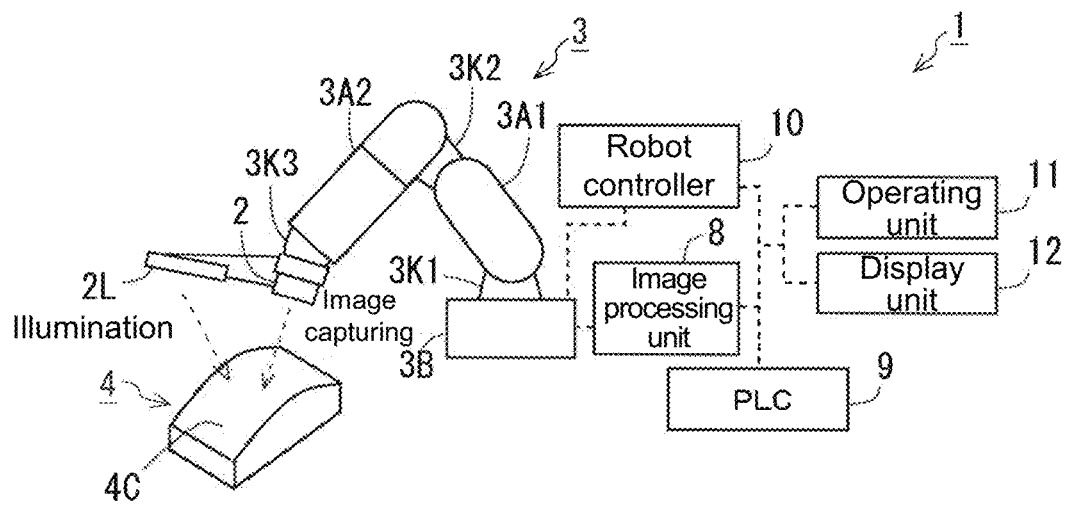
FIG. 2 is a view showing an example of an overall configuration of an image inspecting apparatus.

The image inspecting apparatus 1 will be described in detail below. FIG. 2 is a view showing an example of the overall configuration of the image inspecting apparatus 1. The image inspecting apparatus 1 includes, in addition to the camera 2 and the lighting 2L described above, a robot arm 3 in which the camera 2 and the lighting 2L are provided at a tip, an image processing unit 8 (an example of the "determining part" of the disclosure) in charge of processing of the image data sent from the camera 2, a robot controller 10 controlling the robot arm 3, and a programmable logic controller (PLC) 9 (an example of the "control part" in the disclosure) in charge of control of the camera 2, the lighting 2L, and the robot controller 10. The image processing unit 8 may be, for example, a general-purpose computer having a central processing unit (CPU), a memory, an auxiliary storage apparatus (e.g., a hard disk drive, a solid state drive, etc.), and an input apparatus (a keyboard, a mouse, a touch panel, etc.), or an apparatus dedicated to image processing. The same applies for the PLC 9.

The camera 2 has an image capturing element in which m×n light receiving elements are arrayed in a matrix, and is a device that captures a colored or monochrome, still or moving image to the image processing unit 8. However, in the case in which a special image (X-ray image, thermo image, etc.) other than a visible light image is used for inspection, a sensor adapted to this image may be used.

The lighting 2L is provided along with the camera 2. The lighting 2L is an illumination part that illuminates the object 4 under inspection. The lighting 2L may be, for example, an illumination part having a single light source or may also be an illumination part having a plurality of light sources capable of respectively emitting illuminating light in different wavelengths (red light, green light, blue light) at arbitrary intensities. The lighting 2L is a lighting part for illumination with light of an illuminating pattern in various shapes. As the lighting 2L, for example, an image display device such as a liquid crystal display can be used.

The robot arm 3 is a so-called multiple joint robot, and includes a first arm 3A1 connected to a base 3B via a first joint 3K1, and a second arm 3A2 connected to the tip part of the first arm 3A1 via a second joint 3K2. The camera 2 and the lighting 2L are provided at the tip of the second arm 3A2 via a third joint 3K3. A drive mechanism, such as a motor, for rotating each arm around the axis of each joint is built in the robot arm 3 and operates according to the instruction sent from the image processing unit 8.

The image processing unit 8 is in charge of various processes of the image of the object 4 under inspection captured by the camera 2 by executing a computer program developed in the memory by the CPU. In addition, the PLC 9 controls the respective parts of the image inspecting apparatus 1 by executing the computer program developed in the memory by the CPU.

An operating unit 11 and a display unit 12 are provided in the image inspecting apparatus 1. The operating unit 11 is an input apparatus disposed to an appropriate place easy for the operator handling the image inspecting apparatus 1 to operate, and receives various operations performed by the operator on the image inspecting apparatus 1. The operating unit 11 may be a touch panel integrating the display unit 12, a keyboard commonly used for a general purpose computer, or a specifically designed input apparatus. The display unit 12 is a display apparatus disposed to an appropriate place easily visible for the operator handling the image inspecting apparatus 1, and displays the status of each component of the image inspecting apparatus 1, and the image obtained by the camera 2.

When image inspection is started at the image inspecting apparatus 1, the PLC 9 instructs the robot controller 10 and operates the robot arm 3, so that the camera 2 and the lighting 2L are moved to the appropriate position and the camera 2 photographs the object 4 under inspection. Then, the PLC 9 deforms the illuminating pattern of the lighting 2L so that in the case in which the lighting 2L illuminates the object 4 under inspection at this position, even if the illuminating pattern of the lighting 2L is deformed by the curved portion 4C, the stripe-patterned illuminating pattern in which linear bands are arranged at equal intervals is still photographed in the image of the camera 2.

Figure 3:
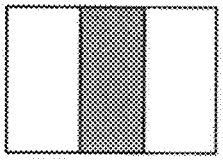
FIG. 3 is a view exemplifying an image that a camera photographs in a case in which a band-like illuminating pattern is irradiated on a workpiece.

The illuminating pattern of the lighting 2L is deformed as follows. FIG. 3 is a view exemplifying an image that a camera photographs in a case in which a band-like illuminating pattern is irradiated on a workpiece. As shown in FIG. 3, in the case in which the band-like illuminating pattern is irradiated on a planar portion of the workpiece, the band in a predetermined thickness is photographed in the image in which the planar portion is photographed. In addition, in the case in which the band-like illuminating pattern is irradiated to a convex portion of the workpiece, in the image in which the convex portion is photographed, a curved band or a band thinner than the predetermined thickness is photographed. Moreover, in the case in which the band-like illuminating pattern is irradiated to a concave portion of the workpiece, in the image in which the concave portion is photographed, a band thicker than the predetermined thickness is photographed.

Therefore, in the image inspecting apparatus 1, the illuminating pattern of the lighting 2L is created as follows.

Figure 4:
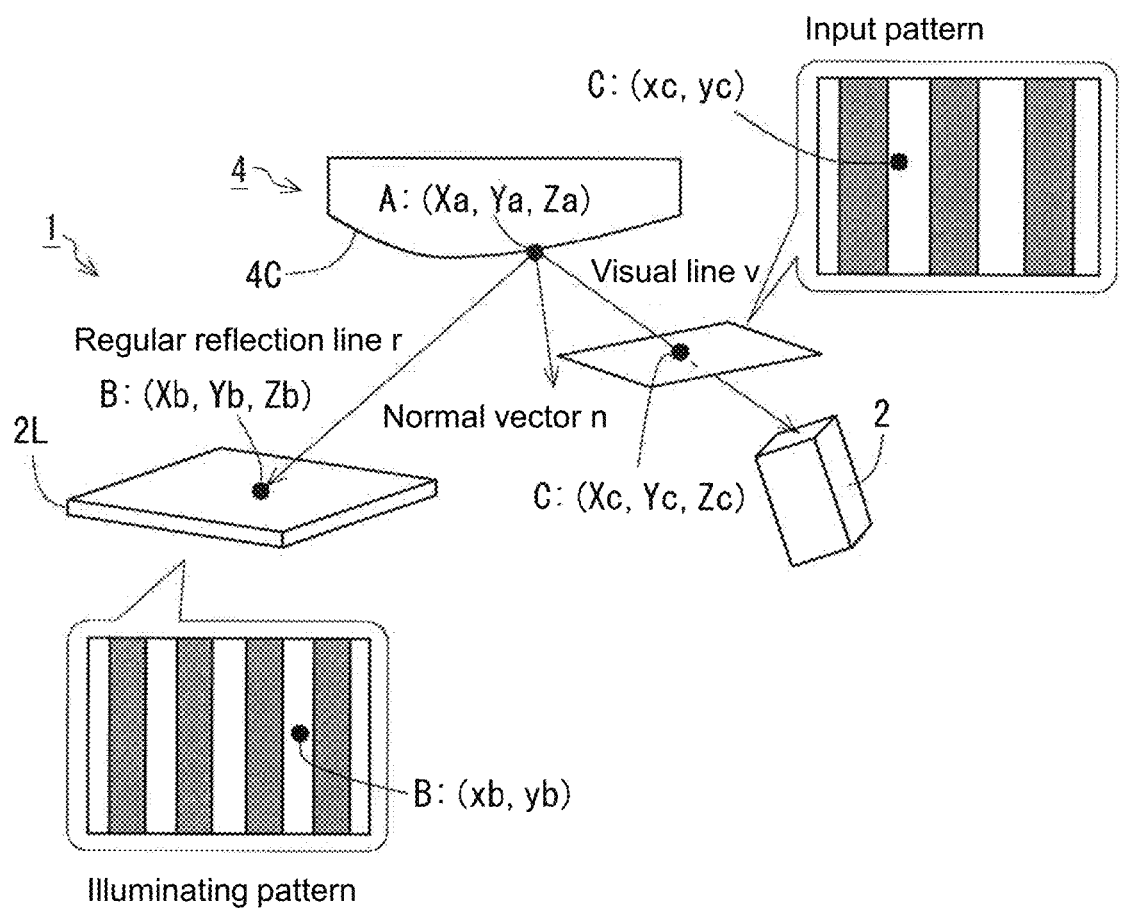
FIG. 4 is a view showing a first example of a method for creating an illuminating pattern of illumination performed by an image inspecting apparatus.

FIG. 4 is a view showing a first example of the method for creating the illuminating pattern of the lighting 2L performed by the image inspecting apparatus 1.

<Creating the illuminating pattern> In creating the illuminating pattern of the lighting 2L, firstly, the corresponding relationship between each point of the image and each point of illumination is specified. The corresponding relationship between each point of the image and each point of illumination can be specified as follows. For example, the position of the camera 2 is set as a viewpoint, a virtual straight line connecting an arbitrary point C (Xc, Yc, Zc) (an example of the "virtual point" of the disclosure) of the object 4 under inspection photographed in the image is set as a visual line v. The shape of the object 4 under inspection is known from the data of the design drawing of the object 4 under inspection or the data obtained by three-dimensionally measuring a good product of the same kind as the object 4 under inspection. Also, the position of the camera 2 is known from the robot controller 10 which controls the robot arm 3. If the shape of the object 4 under inspection and the position of the camera 2 are known, the coordinates (Xa, Ya Za) of an intersecting point A (an example of the "reflecting point" of the disclosure) between the visual line v and the surface of the object 4 under inspection can be obtained uniquely.

Next, a normal vector of the surface of the object 4 under inspection at the intersecting point A is set as n. According to the rule of regular reflection, the normal vector n is a vector that bisects the visual line v and a regular reflection line r. By exploiting this relationship, the regular reflection line r can be derived from the visual v and the normal vector n.

Also, the position of the lighting 2L is known from the robot controller 10 controlling the robot arm 3. If the position of the lighting 2L is known, the coordinates (Xb, Yb, Zb) of a point B (an example of the "corresponding point" of the disclosure) which is an intersecting point between the regular reflection line r and the light-emitting surface of the lighting 2L can be obtained.

Accordingly, the corresponding relationship between the arbitrary point C (Xc, Yc, Zc) of the object 4 under inspection photographed in the image and the coordinates (Xb, Yb, Zb) of the point B on the light-emitting surface of the lighting 2L is specified. In this way, the correspondence between the coordinates (xc, yc) of the arbitrary point C on the image and the coordinates (xb, yb) of the arbitrary point B on the light-emitting surface of the lighting 2L corresponding thereto is completed.

After the corresponding relationship between each point of the image and each point of illumination is specified, the light-emitting intensity of each point on the light-emitting surface of the lighting 2L is determined. For example, in the case in which the camera 2 photographs the stripe pattern, a density (white or black) of each point C on the image for drawing the stripe pattern in the predetermined shape in the image is determined. Then, the light-emitting intensity of each point B (xb, yb) on the light-emitting surface corresponding to each point C on the image is made proportional to the density. If a halftone is used for the density, a stripe pattern that changes in a sinusoidal manner as used in the phase shift method, for example, can also be coped with.

The illuminating pattern of the lighting 2L may be created, for example, by the image processing unit 8 of the image inspecting apparatus 1, or may also be created by using a device other than the image inspecting apparatus 1. The illuminating pattern of the lighting 2L created by the above method is used in the image inspecting apparatus 1 as follows, for example.

That is, when the image inspection is started at the image inspecting apparatus 1, the PLC 9 causes the image processing unit 8 to control the lighting 2L so that the light-emitting surface of the lighting 2L emits light in the illuminating pattern created by the above method. If the lighting 2L is an image display device such as a liquid crystal display, etc., the PLC 9 causes the image processing unit 8 to generate a signal of the image of the illuminating pattern created by the above method and causes the lighting 2L to display the illuminating pattern created by the above method.

Figure 5:
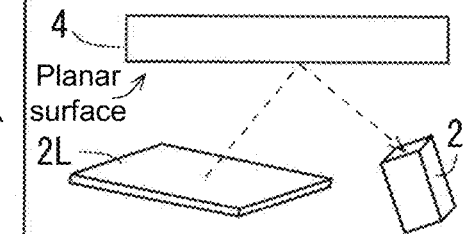
FIG. 5 is a view showing an example of a corresponding relationship between a shape of a workpiece and an illuminating pattern that is created.

FIG. 5 is a view showing an example of a corresponding relationship between the shape of the workpiece and the illuminating pattern that is created.

For example, in the case in which image inspection is performed on a planar portion of object 4 under inspection by using the image inspecting apparatus 1, within the range of the planar portion, wherever the point A at which the visual line v and the surface of the object 4 under inspection intersect is located, since the normal vector n of the surface of the object 4 under inspection at the point A is in a constant direction, the corresponding relationship between the coordinates (xc, yc) of the arbitrary point C on the image and the coordinates (xb, yb) of the arbitrary point B on the light-emitting surface of the lighting 2L corresponding to the coordinates (xc, yc) of the arbitrary point C is linear in the X-axis and Y-axis. Therefore, for example, in the case of photographing the band-like illuminating pattern in which bands in the predetermined thickness are arranged in the image, as shown in Column A of FIG. 5, the illuminating pattern that is created is a band-like illuminating pattern in which bands in the predetermined thickness are arranged.

Further, for example, in the case in which image inspection is performed on a convex portion of the object 4 under inspection by using the image inspecting apparatus 1, within the range of the convex portion, the normal vector n of the surface of the object 4 under inspection at the point A changes according to the position of the point A at which the visual line v and the surface of the object 4 under inspection intersect. Therefore, the corresponding relationship between the coordinates (xc, yc) of the arbitrary point C on the image and the coordinates (xb, yb) of the arbitrary point B of the light-emitting surface of the lighting 2L corresponding to the coordinates (xc, yc) of the arbitrary point C is non-linear. Since the direction of the normal vector n is basically a direction away from the direction in which the camera 2 and lighting 2L are present, for example, in the case of photographing the band-like illuminating pattern in which bands in the predetermined thickness are arranged in the image, as shown in Column B of FIG. 5, the illuminating pattern that is created is a band-like illuminating pattern in which bands having a greater width than the bands in the predetermined thickness are arranged.

Further, for example, in the case in which image inspection is performed on a concave portion of the object 4 under inspection by using the image inspecting apparatus 1, within the range of the concave portion, the normal vector n of the surface of the object 4 under inspection at the point A changes according to the position of the point A at which the visual line v and the surface of the object 4 under inspection intersect. Therefore, the corresponding relationship between the coordinates (xc, yc) of the arbitrary point C on the image and the coordinates (xb, yb) of the arbitrary point B of the light-emitting surface of the lighting 2L corresponding to the coordinates (xc, yc) of the arbitrary point C is non-linear. Since the direction of the normal vector n is basically a direction toward the direction in which the camera 2 and lighting 2L are present, for example, in the case of photographing the band-like illuminating pattern in which bands in the predetermined thickness are arranged in the image, as shown in Column C of FIG. 5, the illuminating pattern that is created is a band-like illuminating pattern in which bands having a smaller width than the bands in the predetermined thickness are arranged.

In the image inspecting apparatus 1, the light of the illuminating pattern created as described above is irradiated from the lighting 2L to the object 4 under inspection, and the camera 2 photographs the object 4 under inspection in this state. Then, the image of the object 4 under inspection obtained by the camera 2 is processed in the image processing unit 8 as follows, for example.

Figure 6:
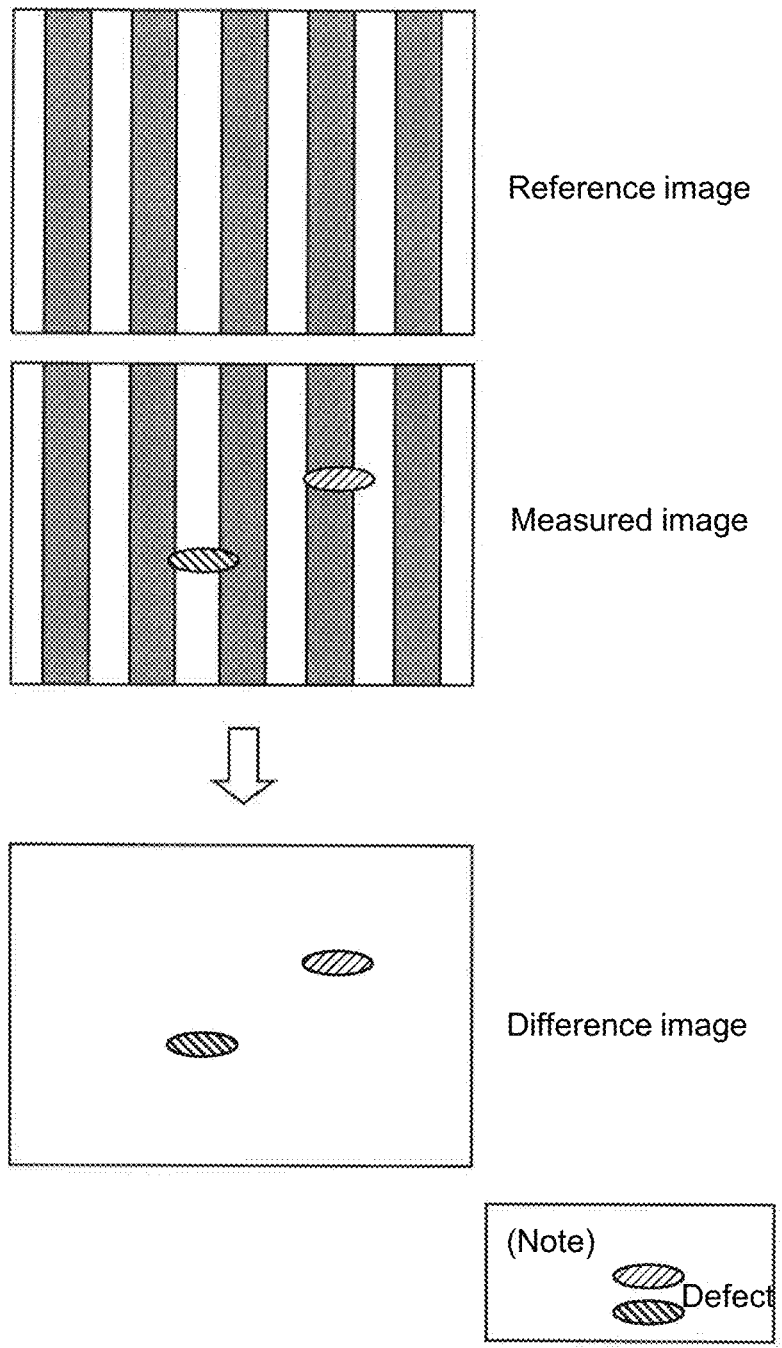
FIG. 6 is a view showing an example of image processing performed by an image processing unit.

FIG. 6 is a view showing an example of image processing performed by the image processing unit 8. When the image of the object 4 under inspection is captured by the camera 2 under the control of the PLC 9, the image processing unit 8 analyzes the image data obtained by the camera 2. The image processing unit 8 determines whether a defect is present or absent from the image in which the object 4 under inspection is photographed. The image processing unit 8 makes determination on whether the defect is present or absent by, for example, the method as follows.

For example, in the case in which the object 4 under inspection photographed in the image obtained by the camera 2 has no defect, there is no difference generated even if the image of the camera 2 is compared with the reference image in which a good object 4 under inspection without a defect is photographed. On the other hand, in the case in which the object 4 under inspection photographed the image obtained by the camera 2 has a defect, a difference is generated when the image of the camera 2 is compared with the reference image in which a good object 4 under inspection without a defect is photographed. Therefore, the image processing unit 8 looks for the difference between the reference image and the image of the camera 2 in which the object 4 under inspection is photographed when determining whether the defect is present or absent. Since the image inspecting apparatus 1 creates the illuminating pattern so as to depict the stripe pattern in the predetermined shape on the image, as a reference image used as the reference image, the image inspecting apparatus 1 only needs to have one type of model independent of the shape of the object 4 under inspection whose image is captured by the camera 2. In the image photographed when the object 4 under inspection is illuminated with the stripe-patterned illuminating pattern in which linear bands are arranged at equal intervals, since the image photographs the illuminating pattern deformed by the shape of the object 4 under inspection, in order to detect a defect from such an image, it is necessary to perform a complicated filtering process for removing the influence of the deformed illuminating pattern or to facilitate the reference image for each shape of the object 4 under inspection. In this regard, in the case of the image inspecting apparatus 1 described above, since the determination on whether the defect is present or absent can be made by using the reference image of one type of model, the increase in inspection time and the decrease in detection accuracy in the case in which the place irradiated by the pattern light is a curved surface can be suppressed as much as possible.

Further, in the case in which the phase shift method is applied to the image inspecting apparatus 1, the following effects are obtained. In the case in which the phase shift method is applied to the image inspecting apparatus 1, as described above, the normal direction of the surface of the object 4 under inspection is estimated by using the illuminating pattern with the stripe-like pattern whose phase changes in a sinusoidal manner and the defect is detected by looking for the singular point (a point with a different phase as compared with the surroundings). In the regular phase shift method, since a uniform stripe pattern is used as the illuminating pattern, when the image of the object 4 under inspection having the curved portion 4C is captured, due to the shape of the curved portion 4C, the stripe observed with the camera is deformed, and the width of the stripe is increased or decreased.

When the width of the stripe is set to an appropriate width corresponding to the size of the defect to be detected, the detection accuracy of the defect in this size is maximized. The detection accuracy decreases if the width of the stripe is too small or too large to be the appropriate size of the defect to be detected. Therefore, for example, in the case in which image inspection is performed on a workpiece having a curved portion like the object 4 under inspection by using the phase shift method, although it can be considered to adopt a method of preparing an illuminating pattern with variation in the width of the stripe, the time required for image capturing increases as the number of illuminating patterns increases.

In this regard, in the case of the image inspecting apparatus 1, the illuminating pattern is created so as to photograph the image of the stripe-patterned illuminating pattern in which the stripe in the predetermined width is arranged. In creating the illuminating pattern described above, in order to photograph the stripe pattern whose phase changes in a sinusoidal manner by using the camera 2, the light-emitting intensity of each point B (xb, yb) on the light-emitting surface corresponding to each point C on the image is determined, so that the density of each point C on the image changes in phase in a sinusoidal manner. This light-emitting intensity is a dynamic value. The illuminating pattern created in this way is irradiated from the lighting 2L, and with the camera 2 capturing the image of the object 4 under inspection at this time, the phase image in which the density of each point C on the image changes in phase from 0 degrees to 360 degrees in a sinusoidal manner is obtained. Then, when processing the phase image, the image processing unit 8 looks for the difference from one type of phase image (reference image) independent of the shape of the object 4 under inspection, and can easily detect a defect based on this difference. Therefore, even if the phase shift method is applied to image inspecting apparatus 1, the defect detection accuracy can still be maintained without preparing the illuminating pattern showing variations of width in the stripe-patterned pattern of object 4 under inspection photographed by the camera 2.

While the stripe-patterned illuminating pattern is exemplified above, the illuminating pattern irradiated by the lighting 2L may be, for example, one band. Also, while the stripe-patterned illuminating pattern in which a plurality of longitudinally extending bands are arranged laterally is shown above, the illuminating pattern irradiated by the lighting 2L may also be, for example, a stripe-patterned illuminating pattern in which a plurality of laterally extending bands are vertically arranged.

Figure 7:
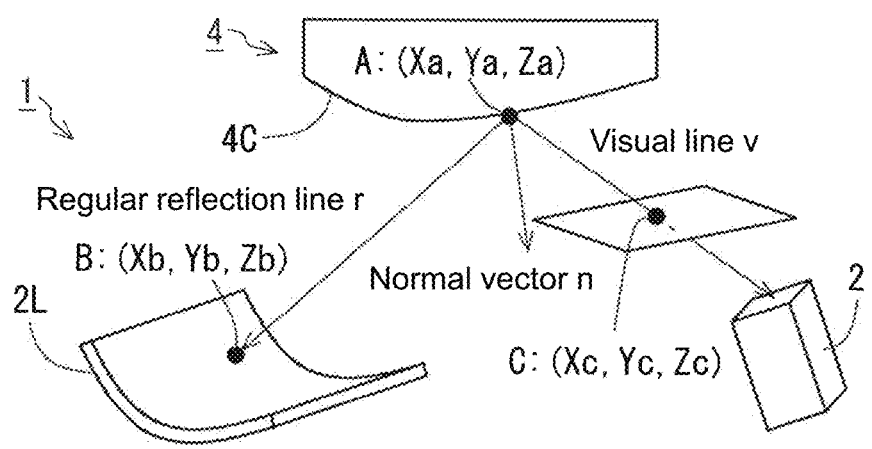
FIG. 7 is a view showing a second example of a method for creating an illuminating pattern of illumination performed by an image inspecting apparatus.

Also, the lighting 2L is not limited to one having a flat light-emitting surface. The lighting 2L may have, for example, a curved light-emitting surface. FIG. 7 is a view showing a second example of the method for creating the illuminating pattern of the lighting 2L performed by the image inspecting apparatus 1.

If the shape of the light-emitting surface of the lighting 2L is known, even if the light-emitting surface of the lighting 2L is a curved surface, like the flat surface, the coordinates (Xb, Yb, Zb) of the point B which is the intersecting point between the regular reflection line r and the light-emitting surface of the lighting 2L can be derived. Therefore, even if the light-emitting surface of the lighting 2L is a curved surface, the corresponding relationship between the arbitrary point C (Xc, Yc, Zc) of the object 4 under inspection photographed in the image and the coordinates (Xb, Yb, Zb) of the point B on the light-emitting surface of the lighting 2L can be specified. Accordingly, the coordinates (xc, yc) of the arbitrary point C on the image can correspond to the coordinates (xb, yb) of the arbitrary point B on the light-emitting surface of the lighting 2L corresponding to the coordinates (xc, yc) of the arbitrary point C. Therefore, the light-emitting intensity of each point B (xb, yb) on the light-emitting surface corresponding to each point C on the image can be determined.

As shown in FIG. 7, if the lighting 2L sets a concave curved surface surrounding the object 4 under inspection as the light-emitting surface, since the range in which the regular reflection line r can be captured is expanded, the corresponding range of the shape variation of the object 4 under inspection is wider than the case in which the light-emitting surface is a flat surface.

<Computer-Readable Recording Medium> A program for causing a computer or other machines or apparatuses (hereinafter, the computer or the like) to realize any one of the above processes can be recorded on a recording medium readable by the computer or the like, and the computer or the like reads and executes the program of the recording medium, so that the function can be provided.

Here, the recording medium readable by the computer or the like refers to a recording medium that can accumulate information such as data, programs, etc. by electrical, magnetic, optical, mechanical, or chemical functioning, and can be read from a computer or the like. Among such recording media, those that can be detached from the computer or the like include, for example, a memory card such as a flexible disk, a magneto optical disk, a CD-ROM, a CD-R/W, a DVD, a Blu-ray (Blu-ray is a registered trademark) disk, DAT, an 8-mm tape, a flash memory, etc. In addition, recording media fixed to the computer or the like include a hard disk, an SSD, a read only memory (ROM), etc.

It should be noted that the above-described embodiments and modifications are examples of the disclosure, and the technical scope of the invention disclosed in the disclosure is not limited to the above embodiments and modified examples.

What is claimed is:

1. An image inspecting apparatus for inspecting an object under inspection by using an image, the image inspecting apparatus comprising:
   a lighting part which irradiates the object under inspection with a pattern light;
   an image capturing part which captures an image of the object under inspection; and
   a control part which causes the lighting part to irradiate the pattern light in a shape that is created based on a positional relationship between the lighting part and the image capturing part and shape data of the object under inspection so that, in a case where the lighting part irradiates the object under inspection with the pattern light, a shape of the irradiated pattern light on the object as being photographed in the image captured by the image capturing part matches a predetermined pattern, from which an influence on the irradiated pattern light due to the shape of the object is removed.

2. The image inspecting apparatus according to claim 1, wherein the control part specifies, concerning each position on an image capturing surface, a corresponding point at a position where a second virtual line intersects a light-emitting surface of the lighting part, wherein with respect to a first virtual line connecting a virtual point as a specified position on the image capturing surface of the image capturing part and a reflecting point as an actual position corresponding to the virtual point on the object under inspection photographed on the image capturing surface, the second virtual line adopts a normal line of the reflecting point of the object under inspection as a center and is line symmetrical to the first virtual line, and
   the control part creates a shape of pattern light of the light-emitting surface based on a corresponding relationship between the virtual point and the corresponding point, such that the pattern light in a shape of the predetermined pattern is emitted to the image capturing surface.

3. The image inspecting apparatus according to claim 2, wherein the predetermined pattern is a linear or stripe-like light pattern.

4. The image inspecting apparatus according to claim 3, further comprising a determining part which determines whether a defect of the object under inspection is present or absent based on a difference between the shape of the light irradiated on the object under inspection as being photographed in the image of the object under inspection captured by the image capturing part and the predetermined pattern.

5. The image inspecting apparatus according to claim 4, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

6. The image inspecting apparatus according to claim 3, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

7. The image inspecting apparatus according to claim 2, further comprising a determining part which determines whether a defect of the object under inspection is present or absent based on a difference between the shape of the irradiated pattern light on the object as being photographed in the image of the object under inspection captured by the image capturing part and the predetermined pattern.

8. The image inspecting apparatus according to claim 7, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

9. The image inspecting apparatus according to claim 1, wherein the predetermined pattern is a linear or stripe-like light pattern.

10. The image inspecting apparatus according to claim 9, further comprising a determining part which determines whether a defect of the object under inspection is present or absent based on a difference between the shape of the irradiated pattern light on the object as being photographed in the image of the object under inspection captured by the image capturing part and the predetermined pattern.

11. The image inspecting apparatus according to claim 10, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

12. The image inspecting apparatus according to claim 9, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

13. The image inspecting apparatus according to claim 1, further comprising a determining part which determines whether a defect of the object under inspection is present or absent based on a difference between the shape of the irradiated pattern light on the object as being photographed in the image of the object under inspection captured by the image capturing part and the predetermined pattern.

14. The image inspecting apparatus according to claim 13, wherein the control part causes the lighting part to irradiate the pattern light in a plurality of shapes so that, in the case where the lighting part irradiates the object under inspection with the pattern light, the predetermined pattern is the stripe-like light pattern, and the shapes match a plurality of pattern light where phases of the strip change.

15. An image inspecting method for inspecting an object under inspection by using an image, comprising:
   irradiating the object under inspection with a pattern light by using a lighting part;
   capturing an image of the object under inspection by using an image capturing part; and
   causing the lighting part to irradiate the pattern light in a shape that is created based on a positional relationship between the lighting part and the image capturing part and shape data of the object under inspection so that, in a case where the lighting part irradiates the object under inspection with the pattern light, a shape of the irradiated pattern light on the object as being photographed in the image captured by the image capturing part matches a predetermined pattern, from which an influence on the irradiated pattern light due to the shape of the object is removed.

16. A non-transitory computer readable recording medium comprising an image inspecting program for inspecting an object under inspection by using an image, the image inspecting program causing a computer to execute:
   irradiating the object under inspection with a pattern light by using a lighting part;
   capturing an image of the object under inspection by using an image capturing part; and
   causing the lighting part to irradiate the pattern light in a shape that is created based on a positional relationship between the lighting part and the image capturing part and shape data of the object under inspection so that, in a case where the lighting part irradiates the object under inspection with the pattern light, a shape of the irradiated pattern light on the object as being photographed in the image captured by the image capturing part matches a predetermined pattern, from which an influence on the irradiated pattern light due to the shape of the object is removed.

* * * * *